United States Patent
Kim et al.

(10) Patent No.: US 11,581,531 B2
(45) Date of Patent: Feb. 14, 2023

(54) NEGATIVE ELECTRODE SLURRY FOR LITHIUM SECONDARY BATTERY, AND PREPARATION METHOD THEREOF

(71) Applicant: LG CHEM, LTD., Seoul (KR)

(72) Inventors: Dong Hyun Kim, Daejeon (KR); Houng Sik Yoo, Daejeon (KR); Hyeon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 227 days.

(21) Appl. No.: 17/052,301

(22) PCT Filed: Jun. 7, 2019

(86) PCT No.: PCT/KR2019/006902
§ 371 (c)(1),
(2) Date: Nov. 2, 2020

(87) PCT Pub. No.: WO2019/235890
PCT Pub. Date: Dec. 12, 2019

(65) Prior Publication Data
US 2021/0234162 A1    Jul. 29, 2021

(30) Foreign Application Priority Data

Jun. 8, 2018 (KR) .................... 10-2018-0066079

(51) Int. Cl.
| | | |
|---|---|---|
| H01M 4/485 | (2010.01) | |
| H01M 4/131 | (2010.01) | |
| H01M 4/62 | (2006.01) | |
| H01M 10/0525 | (2010.01) | |
| H01M 4/02 | (2006.01) | |

(52) U.S. Cl.
CPC .......... *H01M 4/485* (2013.01); *H01M 4/131* (2013.01); *H01M 4/622* (2013.01); *H01M 10/0525* (2013.01); *H01M 2004/021* (2013.01); *H01M 2004/027* (2013.01)

(58) Field of Classification Search
CPC ...... H01M 4/485; H01M 4/131; H01M 4/622; H01M 10/0525; H01M 2004/021; H01M 2004/027; H01M 4/1391; H01M 4/62; Y02E 60/10
See application file for complete search history.

(56) References Cited

U.S. PATENT DOCUMENTS

| | | | |
|---|---|---|---|
| 2013/0295455 A1 | 11/2013 | Lim et al. | |
| 2014/0377656 A1 | 12/2014 | Lim et al. | |
| 2017/0110723 A1* | 4/2017 | Ishibashi | H01M 4/623 |
| 2019/0157679 A1* | 5/2019 | Daigle | H01M 4/131 |

FOREIGN PATENT DOCUMENTS

| | | |
|---|---|---|
| JP | 2014-194927 A | 10/2014 |
| JP | 2015-513193 A | 4/2015 |
| KR | 10-2012-0071448 A | 7/2012 |
| KR | 10-2013-0116033 A | 10/2013 |
| KR | 10-2013-0117709 A | 10/2013 |
| KR | 10-2013-0123491 A | 11/2013 |
| KR | 10-2015-0008539 A | 1/2015 |
| WO | WO 2015/098050 A1 | 7/2015 |
| WO | WO 2016/038682 A1 | 3/2016 |
| WO | WO 2018/000101 A1 | 1/2018 |

OTHER PUBLICATIONS

Extended European Search Report dated Apr. 30, 2021 for Application No. 19814256.4.
Jung et al., "Reinforcement of an electrically conductive network with ethanol as a dispersing agent in the slurry preparation step", Journal of Power Sources, vol. 287, 2015 (Available online Apr. 9, 2015), pp. 359-362.
Arakawa, "Introduction to particle size measurement", Journal of the Society of Powder Technology, 1980, vol. 17, No. 6, pp. 299-307, with partial translation.
International Search Report issued in PCT/KR2019/006902 (PCT/ISA/210), dated Sep. 11, 2019.
Lee et al., "Effect of poly( acrylic acid) on adhesion strength and electrochemical performance of natural graphite negative electrode for lithium-ion batteries", Journal of Power Sources, vol. 161, 2006, pp. 612-616.

* cited by examiner

*Primary Examiner* — Andrew J. Oyer
(74) *Attorney, Agent, or Firm* — Birch, Stewart, Kolasch & Birch, LLP

(57) ABSTRACT

A negative electrode slurry and a method of preparing the same. The negative electrode slurry includes lithium titanium oxide (LTO), a carboxylic acid-containing polymer dispersant, a binder, and an aqueous solvent. The carboxylic acid-containing polymer dispersant has a weight average molecular weight (Mw) of 2,500 g/mol to 500,000 g/mol and is present in an amount of 1.5 parts by weight to 20 parts by weight with respect to 100 parts by weight of the lithium titanium oxide.

14 Claims, No Drawings

NEGATIVE ELECTRODE SLURRY FOR LITHIUM SECONDARY BATTERY, AND PREPARATION METHOD THEREOF

CROSS-REFERENCE TO RELATED APPLICATIONS

This application claims the benefit of Korean Patent Application No. 10-2018-0066079, filed on Jun. 8, 2018, in the Korean Intellectual Property Office, the disclosure of which is incorporated herein in its entirety by reference.

TECHNICAL FIELD

The present invention relates to a negative electrode slurry for a lithium secondary battery and a method of preparing the same, and more particularly to an aqueous negative electrode slurry having a high solid content which addresses an increased viscosity problem of an aqueous negative electrode slurry including lithium titanium oxide (LTO), and a method of preparing the same.

BACKGROUND ART

In line with an increase in technological development of and demand for mobile devices, demand for secondary batteries as energy sources is rapidly increasing, and among these secondary batteries, lithium secondary batteries which have high energy density, a high operating voltage, a long cycle lifespan, and a low self-discharge rate are commercially available and widely used.

In addition, as interest in environmental problems has recently increased, research on electric vehicles (EVs), hybrid electric vehicles (HEVs), and the like that can replace vehicles using fossil fuels, such as gasoline vehicles and diesel vehicles, which are one of the major causes of air pollution, is actively conducted.

As power sources of these EVs, HEVs, and the like, nickel-metal hydride (Ni-MH) secondary batteries or lithium secondary batteries which have high energy density, high discharge voltage, and high output stability are used. In a case in which a lithium secondary battery is used in EVs, long-term use for 10 years or longer under harsh conditions, in addition to high energy density and high output in a short time, are required, and thus much higher safety and superior long-term lifespan characteristics than those of existing small lithium secondary batteries are necessarily required. In addition, secondary batteries used in EVs, HEVs, and the like require excellent rate characteristics and excellent power characteristics in accordance with operating conditions of vehicles.

As active materials of lithium secondary batteries, lithium titanium oxides having a high Li intercalation/deintercalation potential has recently drawn attention. These lithium titanium oxides are advantageous in terms of excellent rapid charging or excellent low-temperature performance since Li metal is not deposited at a Li intercalation/deintercalation potential. However, lithium titanium oxides themselves have low electrical conductivity and a slow Li-ion diffusion rate compared to carbon materials such as graphite, and thus there is a need to decrease the particle size thereof to obtain substantially a high output, but in this case, there is a problem of an increased viscosity of a negative electrode slurry including the lithium titanium oxide. In addition, to address the viscosity problem of the negative electrode slurry, the solid content of the negative electrode slurry needs to be reduced, which results in reduced battery capacity.

Such a viscosity problem of the negative electrode slurry becomes worse in negative electrode slurries including aqueous solvents, compared to negative electrode slurries including non-aqueous solvents, but in consideration of a need to protect the environment and reduce manufacturing costs, continuous efforts to apply an aqueous solvent to a negative electrode slurry are required.

Therefore, there is a need to develop a negative electrode slurry which has a high solid content and has appropriate viscosity so as to appropriately form a negative electrode active material layer on a negative electrode current collector, in which the negative electrode slurry is an aqueous negative electrode slurry including lithium titanium oxide.

DISCLOSURE

Technical Problem

An object of the present invention is to provide a negative electrode slurry having a high solid content and exhibiting appropriate viscosity.

Another object of the present invention is to provide a method of preparing the above-described negative electrode slurry.

Still another object of the present invention is to provide a negative electrode for a lithium secondary battery which includes the above-described negative electrode slurry, and a lithium secondary battery including the negative electrode.

Technical Solution

According to an aspect of the present invention, there is a provided a negative electrode slurry including lithium titanium oxide (LTO), a carboxylic acid-containing polymer dispersant, a binder, and an aqueous solvent, wherein the carboxylic acid-containing polymer dispersant has a weight average molecular weight (Mw) of 2,500 g/mol to 500,000 g/mol and is included in an amount of 1.5 parts by weight to 20 parts by weight with respect to 100 parts by weight of the lithium titanium oxide.

According to another aspect of the present invention, there is provided a method of preparing the negative electrode slurry, including: (1) preparing a premixed slurry by mixing lithium titanium oxide (LTO), a carboxylic acid-containing polymer dispersant, a binder, and an aqueous solvent; and (2) dispersing the premixed slurry to which the dispersant is added, by stirring, wherein the carboxylic acid-containing polymer dispersant has a weight average molecular weight (Mw) of 2,500 g/mol to 500,000 g/mol and is included in an amount of 1.5 parts by weight to 20 parts by weight with respect to 100 parts by weight of the lithium titanium oxide.

According to still another aspect of the present invention, there are provided a negative electrode for a lithium secondary battery including the negative electrode slurry, and a lithium secondary battery including the negative electrode.

Advantageous Effects

A negative electrode slurry according to the present invention can achieve a large negative electrode loading amount due to a high solid content thereof and also exhibits appropriate viscosity, and thus can address problems in negative electrode manufacturing processes due to the high viscosity of aqueous negative electrode slurries including lithium titanium oxide (LTO).

BEST MODE FOR CARRYING OUT THE INVENTION

Hereinafter, the present invention will be described in more detail to aid in understanding of the present invention.

The terms or words used in the present specification and claims should not be construed as being limited to ordinary or dictionary meanings and should be construed as having meanings and concepts consistent with the spirit of the present invention based on the principle that an inventor can appropriately define terms to explain his/her invention in the best way.

Negative Electrode Slurry

A negative electrode slurry according to the present invention, which is an aqueous negative electrode slurry for a lithium secondary battery, includes lithium titanium oxide (LTO), a carboxylic acid-containing polymer dispersant, a binder, and an aqueous solvent, in which the carboxylic acid-containing polymer dispersant has a weight average molecular weight (Mw) of 2,500 g/mol to 500,000 g/mol and wherein the carboxylic acid-containing polymer dispersant is present in an amount of 1.5 parts by weight to 20 parts by weight with respect to 100 parts by weight of the lithium titanium oxide.

The lithium titanium oxide (LTO) included in the negative electrode slurry according to an embodiment of the present invention may be in the form primary particles, which primary particles are agglomerated into secondary particles.

The primary particles may be nano-sized particles, and such nano-sized particles increase the viscosity of the negative electrode slurry to greater than an appropriate level when included in the negative electrode slurry, and are also susceptible to moisture, so that, when exposed to air, nano-sized particles adsorb a large amount of moisture onto the surfaces of the particles, and thus may deteriorate electrode manufacturing processability and battery characteristics. Therefore, the negative electrode slurry according to an embodiment of the present invention may include the lithium titanium oxide, which is in the form of a secondary particle formed by agglomeration of primary particles.

The lithium titanium oxide has a stable crystal structure, a small change in volume according to charging and discharging, excellent cycle characteristics, and a high redox potential which results in a reduced absolute amount of solid electrolyte interface (SEI) film formation and the consequent decrease in internal resistance, and thus rate capability and high-current characteristics may be enhanced. In addition, LTO is itself capable of participating in the reaction as a redox site, and thus may minimize a decrease in battery capacity.

The secondary particles may have a mean particle diameter ($D_{50}$) of 0.01 μm to 1 μm, particularly, 0.1 μm to 0.95 μm, more particularly, 0.3 μm to 0.9 μm.

When the mean particle diameter ($D_{50}$) of the secondary particles of the lithium titanium oxide is within the above range, the specific surface area relatively increases according to the small particle size, and the movement distance of lithium ions may be shortened to thereby increase a diffusion rate thereof, and thus a lithium secondary battery including the lithium titanium oxide may exhibit high output. When the mean particle diameter ($D_{50}$) of the secondary particles of the lithium titanium oxide is less than the above range, the viscosity of the negative electrode slurry is increased to above an appropriate level, an additional solvent is required so that the negative electrode slurry can have a reduced solid content. When the mean particle diameter ($D_{50}$) of the secondary particles of the lithium titanium oxide is greater than the above range, it may be impossible for the lithium titanium oxide particles to secure an appropriate level of specific surface area and the movement distance of lithium ions may increase, resulting in reduced output of a lithium secondary battery including the lithium titanium oxide.

The term "primary particles" as used in the present specification refers to original particles when a different type of particles are formed from certain particles, and a plurality of primary particles may be agglomerated, bound, or assembled to thereby form a secondary particle.

The term "secondary particle" as used in the present invention refers to a physically distinguishable particle with a large size, which is formed by agglomeration, binding, or assembling of individual primary particles.

The lithium titanium oxide may have a specific surface area of 0.1 m²/g to 50 m²/g, particularly, 0.5 m²/g to 20 m²/g, more particularly, 1 m²/g to 10 m²/g, wherein the specific surface area is measured using a Brunauer-Emmett-Teller (BET) method. When the specific surface area of the lithium titanium oxide is within the above range, low electrical conductivity of the lithium titanium oxide may be compensated for, and low output problems of a lithium secondary battery due to a slow diffusion rate of lithium ions may be compensated for.

In the present invention, the mean particle diameter ($D_{50}$) may be defined as a particle diameter at 50% of the particle size distribution. The mean particle diameter may be measured using, for example, a laser diffraction method or a scanning electron microscope (SEM) image without being limited thereto. When the laser diffraction method is used, it is possible to generally measure a particle size from submicron to about several millimeters, and high reproducibility and high resolution may be obtained.

The lithium titanium oxide may be, for example, represented by Formula 1 below.

[Formula 1]

wherein, in Formula 1, 0.5≤x≤3 and 1≤y≤2.5, particularly, 0.8≤x≤2.8 and 1.3≤y≤2.3. Specifically, the lithium titanium oxide may be, for example, any one selected from the group consisting of $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$ or a mixture of two or more of these materials, but the present invention is not limited thereto.

The carboxylic acid-containing polymer dispersant includes a carboxylic acid structure in the molecular structure thereof, and the carboxylic acid structure enables the lithium titanium oxide to be appropriately dispersed in the aqueous solvent, and thus the increased viscosity problems of aqueous negative electrode slurries including lithium titanium oxide (LTO) as a negative electrode active material may be addressed. In addition, since the viscosity of the negative electrode slurry may be decreased, the negative electrode slurry may have an increased solid content.

To this end, the negative electrode slurry according to the present invention includes a carboxylic acid-containing polymer dispersant that satisfies a certain range of weight average molecular weight (Mw) in a certain amount with respect to the amount of the lithium titanium oxide.

The carboxylic acid-containing polymer dispersant may have a weight average molecular weight (Mw) of 2,500 g/mol to 500,000 g/mol, particularly, 3,000 g/mol to 500,000 g/mol, more particularly, 3,000 g/mol to 250,000 g/mol. When the weight average molecular weight (Mw) of the carboxylic acid-containing polymer dispersant satisfies the above range, the viscosity of the negative electrode slurry may be suppressed, and an increase in the size (coarsening) of slurry particles included in the negative electrode slurry may be suppressed.

In addition, the negative electrode slurry may include the carboxylic acid-containing polymer dispersant in an amount of 1.5 parts by weight to 20 parts by weight, particularly, 2 parts by weight to 15 parts by weight, more particularly, 2 parts by weight to 10 parts by weight, with respect to 100 parts by weight of the lithium titanium oxide. The amount of the carboxylic acid-containing polymer dispersant included in the negative electrode slurry may be determined in proportion to the amount of the lithium titanium oxide. When the above amount range is satisfied, the viscosity of the negative electrode slurry may be suppressed, and an increase in the size of slurry particles included in the negative electrode slurry may be suppressed. When the carboxylic acid-containing polymer dispersant is included in an amount that exceeds a certain amount, it is difficult to anticipate an additional dispersibility improvement effect, and the carboxylic acid-containing polymer dispersant accounts for the solid fraction in an amount more than needed, and thus it may be difficult to secure battery capacity.

The negative electrode slurry according to an embodiment of the present invention satisfies both the ranges of the weight average molecular weight and amount of the carboxylic acid-containing polymer dispersant, and thus an increase in the size of slurry particles included in the negative electrode slurry may be suppressed, and the size of slurry particles included in the negative electrode slurry may be reduced. Particularly, in the negative electrode slurry according to an embodiment of the present invention, the lithium titanium oxide included in the negative electrode slurry is uniformly dispersed without agglomeration, and thus the particle diameter of the lithium titanium oxide included in the negative electrode slurry may be reduced.

The carboxylic acid-containing polymer dispersant is not particularly limited as long as it contains carboxylic acid in the polymer chain and satisfies the above molecular weight range, and may be, for example, a carboxylic acid-containing polymer dispersant containing, in the polymer chain, repeating units derived from acrylic acid, maleic acid, and maleic anhydride, particularly one or more selected from the group consisting of polyacrylic acid, a poly(acrylic acid-maleic acid)copolymer, a poly(maleic acid-styrene)copolymer, a poly(maleic anhydride-isobutylene)copolymer, and a poly(maleic acid-vinyl ether)copolymer, and more particularly one or more selected from the group consisting of polyacrylic acid and a poly(acrylic acid-maleic acid)copolymer.

When the negative electrode slurry according to an embodiment of the present invention includes the above-described carboxylic acid-containing polymer dispersant, an additional dispersibility improvement effect may be exhibited, but when the carboxylic acid-containing polymer dispersant contains the carboxylic acid in a salt form, it is difficult to anticipate an additional dispersibility improvement effect.

The binder is not particularly limited as long as it is a binder commonly used in the preparation of a negative electrode slurry, and may be, for example, various kinds of binder polymers such as a polyvinylidene fluoride-hexafluoropropylene copolymer (PVDF-co-HFP), polyvinylidene fluoride, polyacrylonitrile, polymethylmethacrylate, carboxymethyl cellulose (CMC), polyvinyl alcohol, starch, hydroxypropyl cellulose, diacetyl cellulose, polyvinyl chloride, regenerated cellulose, polyvinylpyrrolidone, tetrafluoroethylene, polyethylene, polypropylene, polyacrylic acid, ethylene-propylene-diene monomers (EPDM), sulfonated EPDM, styrene butadiene rubber (SBR), fluorine rubber, and various copolymers.

The amount of the binder may be 20 wt % or less, particularly, in the range of 0.1 wt % to 10 wt %, more particularly, in the range of 0.1 wt % to 4 wt %, with respect to a total weight of solids of the negative electrode slurry.

The aqueous solvent may include, particularly, water, and may be included in an amount that is sufficient to disperse the lithium titanium oxide, the carboxylic acid-containing polymer dispersant, other additives that may be additionally used, and the like, and enables a negative electrode slurry composition to have appropriate viscosity in consideration of coatability and the like of the negative electrode slurry.

As described above, the negative electrode slurry according to an embodiment of the present invention has relatively low viscosity due to the suppressed increase in viscosity, and thus may have a high solid content.

Accordingly, the negative electrode slurry according to an embodiment of the present invention may have a solid content of 45 wt % or more, particularly, 50 wt % or more, more particularly, 52 wt % or more. Meanwhile, the upper limit of the solid content may be 90 wt %, particularly, 87 wt %, more particularly, 85 wt %. Since the negative electrode slurry according to an embodiment of the present invention has a high solid content with the above range, battery capacity relatively increases. In addition, when a negative electrode is fabricated using the negative electrode slurry, a rolling rate may be reduced to thereby decrease a thickness difference before/after drying and rolling of the negative electrode slurry, and accordingly, damage to components inside the negative electrode slurry, including a negative electrode active material may be reduced, resulting in relatively enhanced battery performance.

The negative electrode slurry according to the present invention may have a viscosity of 4.4 Pa·s or less, particularly, in the range of 0.05 Pa·s to 4 Pa·s, more particularly, in the range of 0.1 Pa·s to 4 Pa·s, at 25° C.

The negative electrode slurry according to an embodiment of the present invention may exhibit relatively low viscosity in spite of a high solid content. For example, the negative electrode slurry may have a viscosity of 4.4 Pa·s or less at 25° C. when including 45 wt % or more of the lithium titanium oxide. Particularly, the negative electrode slurry may have a viscosity of 4.4 Pa·s or less at 25° C. when including 50 wt % or more of the lithium titanium oxide, and more particularly, the negative electrode slurry may have a viscosity of 4.4 Pa·s or less at 25° C. when including 52 wt % or more of the lithium titanium oxide.

The negative electrode slurry according to the present invention may satisfy the above-described solid content range and the above-described viscosity range. The fact that the negative electrode slurry according to the present invention has low viscosity as described above at the above-described solid content range suggests the possibility of further increasing the content of solids included in the negative electrode slurry.

That is, since the increase in viscosity of the negative electrode slurry according to the present invention may be suppressed, the negative electrode slurry may relatively increase the percentage of solids, compared to general negative electrode slurries including lithium titanium oxide. That is, since the negative electrode slurry according to an embodiment of the present invention includes the carboxylic acid-containing polymer dispersant having a weight average molecular weight (Mw) within a specific range in a certain amount in proportion to the amount of the lithium titanium oxide, the increase in viscosity of the negative electrode slurry may be suppressed, and thus the negative electrode slurry may have lower viscosity than that predicted according to the content of solids included in the negative electrode slurry, and accordingly, the solid content may be increased using a method of including the lithium titanium oxide in an additional amount, thereby increasing a negative electrode loading amount.

The negative electrode slurry according to an embodiment of the present invention may have a solid content of the lower limit or more, and thus the effect of an increased negative electrode loading amount due to the high solid content may be exhibited. When the solid content exceeds the upper limit, coarsening of particles of the negative electrode slurry may occur, and particularly, the viscosity of the negative electrode slurry is increased to greater than an appropriate level, and thus processability may be deteriorated during negative electrode fabrication.

In addition, since the negative electrode slurry according to an embodiment of the present invention satisfies viscosity within the above-described range, the solid content may be further appropriately increased as needed.

Meanwhile, the mean particle diameter ($D_{50}$) of the particles included in the negative electrode slurry according to an embodiment of the present invention, i.e., the mean particle diameter ($D_{50}$) of the lithium titanium oxide included in the negative electrode slurry may range from 0.2 µm to 1.5 µm. Particularly, the mean particle diameter ($D_{50}$) of the lithium titanium oxide included in the negative electrode slurry may range from 0.3 µm to 1.2 µm, more particularly, 0.5 µm to 1.1 µm.

An increase in the mean particle diameter ($D_{50}$) of the lithium titanium oxide included in the negative electrode slurry means that the lithium titanium oxide is not dispersed but agglomerated in the negative electrode slurry. As such, when the lithium titanium oxide, which is a negative electrode active material, is agglomerated, the diffusion of ions in a negative electrode active material layer is reduced, resulting in deteriorated lithium secondary battery performance, and therefore, it is important to decrease the mean particle diameter ($D_{50}$) of the lithium titanium oxide included in the negative electrode slurry. The negative electrode slurry according to an embodiment of the present invention includes the lithium titanium oxide having a mean particle diameter ($D_{50}$) within the above-described range, and thus a lithium secondary battery including the negative electrode slurry may exhibit further excellent charge/discharge characteristics.

In addition, the negative electrode slurry may further include a conductive material as needed. The conductive material is not particularly limited as long as it does not cause chemical changes in the fabricated battery and has conductivity, and non-limiting examples of the conductive material include graphite such as natural or artificial graphite; carbon black such as acetylene black, Ketjen black, channel black, furnace black, lamp black, and thermal black; conductive fibers such as carbon fibers, carbon nanotubes, and metallic fibers; metallic powders such as carbon fluoride powder, aluminum powder, and nickel powder; conductive whiskers such as zinc oxide and potassium titanate; conductive metal oxides such as titanium oxide; and conductive materials such as graphene derivatives and polyphenylene derivatives. The conductive material may be used in an amount of 0.1 wt % to 15 wt %, particularly, 1 wt % to 9 wt %, with respect to a total weight of solids of the negative electrode slurry.

The negative electrode slurry may further include a thickener as needed.

The negative electrode slurry may include the thickener in an amount of 0.1 wt % to 3 wt %, particularly, 0.2 wt % to 2 wt %, more particularly, 0.5 wt % to 1.5 wt %, with respect to the total weight of solids of the negative electrode slurry.

When the negative electrode slurry includes the thickener in an amount within the above range, the negative electrode slurry may secure storage stability due to an appropriate thickening effect thereof, and the thickener is included in the negative electrode slurry in a certain amount, and thus does not deteriorate battery performance.

The thickener may be one or more selected from the group consisting of carboxymethyl cellulose (CMC), hydroxypropyl cellulose, and regenerated cellulose, particularly, carboxymethyl cellulose (CMC)

Method of Preparing Negative Electrode Slurry

Hereinafter, a method of preparing a negative electrode slurry according to the present invention will be described.

The negative electrode slurry according to an embodiment of the present invention may be prepared using a method including: (1) preparing a premixed slurry by mixing a binder, lithium titanium oxide (LTO), a carboxylic acid-containing polymer dispersant, and an aqueous solvent; and (2) dispersing the premixed slurry after adding the carboxylic acid-containing polymer dispersant, by stirring.

As described above, the carboxylic acid-containing polymer dispersant has a weight average molecular weight (Mw) of 2,500 to 500,000 and is included in an amount of 1.5 parts by weight to 20 parts by weight with respect to 100 parts by weight of the lithium titanium oxide.

In process (1), a binder, lithium titanium oxide (LTO), a carboxylic acid-containing polymer dispersant, and an aqueous solvent are mixed to prepare a premixed slurry.

The premixed slurry may be prepared by simultaneously mixing a binder, lithium titanium oxide (LTO), a carboxylic acid-containing polymer dispersant having a weight average molecular weight (Mw) of 2,500 g/mol to 500,000 g/mol, and an aqueous solvent, or may also be prepared by first mixing some of the components, and then mixing the other components.

In the method of preparing a negative electrode slurry according to an embodiment of the present invention, the premixed slurry obtained in process (1) may be prepared by, for example, (1-1) mixing a binder, lithium titanium oxide (LTO), and a solvent; and (1-2) preparing a premixed slurry by adding a carboxylic acid-containing polymer dispersant to the mixture obtained in process (1-1).

Meanwhile, the premixed slurry prepared by process (1) may also be prepared by first mixing each of the binder, the lithium titanium oxide (LTO), and the carboxylic acid-containing polymer dispersant with an aqueous solvent, and then mixing all of the resulting mixtures.

The mixing may be performed by a general mixing method, e.g., milling such as ball milling, bead milling, basket milling, or planetary milling, or a method using a mixer such as a homo disper mixer, a homogenizer, a bead mill, a ball mill, a basket mill, an attrition mill, a universal stirrer, a clear mixer, a saw-type impeller, or a TK mixer.

The mixing may be performed through mixing at 1,000 rpm to 10,000 rpm, particularly, 3,000 rpm to 7,000 rpm, for 10 minutes to 1 hour, particularly, 20 minutes to 40 minutes.

In process (2), the premixed slurry to which the dispersant is added is dispersed by stirring.

Before the stirring of process (2), an aqueous solvent may further be added to the premixed slurry as needed. Through further addition of an additional aqueous solvent, the concentration of the premixed slurry may be adjusted, thereby adjusting the content of solids of the prepared negative electrode slurry. Through the dispersion of process (2), the preparation of a negative electrode slurry may be completed.

The dispersion may be performed by a general mixing method, e.g., milling such as ball milling, bead milling, basket milling, or planetary milling, or a method using a mixer such as a homo disper mixer, a homogenizer, a bead mill, a ball mill, a basket mill, an attrition mill, a universal stirrer, a clear mixer, a saw-type impeller, or a TK mixer, or may be performed by mixing using a shaker.

In the method of preparing a negative electrode slurry according to an embodiment of the present invention, the dispersion by stirring may be performed using, for example, a shaker, and the mixing (shaking) using a shaker may be performed using a method of adding beads to the premixed slurry to be mixed, to which the dispersant is added, and shaking the resulting slurry at 100 rpm to 1,000 rpm, particularly, 200 rpm to 500 rpm, for 5 hours to 24 hours, particularly, 12 hours to 18 hours.

The size of the beads may be appropriately determined according to the types and amounts of negative electrode active material and binder, and the type of dispersant, and the bead may have a diameter of, particularly, 0.5 mm to 5 mm.

The present invention provides a negative electrode for a lithium secondary battery including the negative electrode slurry, and the present invention also provides a lithium secondary battery including the negative electrode.

The lithium secondary battery may include a positive electrode, a negative electrode, and a separator disposed between the positive electrode and the negative electrode.

The negative electrode may be fabricated using a general method of manufacturing a negative electrode, which is known in the art, using a negative electrode slurry prepared by the above-described method of preparing a negative electrode slurry.

A negative electrode current collector used in the negative electrode according to an embodiment of the present invention may have a thickness of 3 μm to 500 μm. The negative electrode current collector is not particularly limited as long as it does not cause any chemical change in the fabricated battery and has conductivity, and may be made of, for example, copper, gold, stainless steel, aluminum, nickel, titanium, or calcined carbon; copper or stainless steel that is surface-treated with carbon, nickel, titanium, or silver; an aluminum-cadmium alloy; or the like. In addition, the negative electrode current collector may have fine irregularities at a surface thereof to increase the adhesion between the current collector and the negative electrode active material, and may be in any of various forms including a film, a sheet, foil, a net, a porous structure, a foam, non-woven fabric, and the like.

The negative electrode slurry may include a filler as needed.

The filler is an auxiliary component that suppresses the expansion of an electrode and may be optionally used, and is not particularly limited as long as it is a fibrous material that does not cause any chemical change in the fabricated battery. For example, the filler may be an olefin-based polymer such as polyethylene or polypropylene; or a fibrous material such as glass fiber or carbon fiber.

The positive electrode may be manufactured using a method commonly known in the art. For example, the positive electrode may be manufactured by preparing a slurry by mixing a positive electrode active material with a solvent, a binder, a conductive material, and a dispersant and stirring the resulting mixture, and then applying (e.g, coating) the slurry on a current collector made of a metal material and then pressing and drying the resulting current collector.

The current collector made of a metal material is made of a highly conductive metal that enables a positive electrode active material slurry to be easily adhered thereto, and is not particularly limited as long as it does not cause chemical changes in the fabricated battery and has high conductivity, and examples of the metal material include stainless steel, aluminum, nickel, titanium, and calcined carbon; aluminum or stainless steel that is surface-treated with carbon, nickel, titanium, silver, or the like; and the like. In addition, the current collector may have fine irregularities at a surface thereof to increase the adhesion between the current collector and a positive electrode active material. The current collector may be in any of various forms including a film, a sheet, foil, a net, a porous structure, a foam, non-woven fabric, and the like and may have a thickness of 3 μm to 500 μm.

The positive electrode active material may be, for example, lithium cobalt oxide ($LiCoO_2$); lithium nickel oxide ($LiNiO_2$); $Li[Ni_aCo_bMn_cM^1_d]O_2$ wherein $M^1$ is one or more elements selected from the group consisting of Al, Ga, and In, $0.3 \leq a < 1.0$, $0 \leq b \leq 0.5$, $0 \leq c \leq 0.5$, $0 \leq d \leq 0.1$, and $a+b+c+d=1$; a layered compound or a compound substituted with one or more transition metals, such as $Li(Li_eM^2_{f-e-f}M^3_f)O_{2-g}A_g$ wherein $0 \leq e \leq 0.2$, $0.6 \leq f \leq 1$, $0 \leq f' \leq 0.2$, $0 \leq g \leq 0.2$, $M^2$ includes Mn and one or more selected from the group consisting of Ni, Co, Fe, Cr, V, Cu, Zn, and Ti, $M^3$ is one or more selected from the group consisting of Al, Mg, and B, and A is one or more selected from the group consisting of P, F, S, and N; lithium manganese oxides such as $Li_{1+h}Mn_{2-h}O_4$ wherein $0 \leq h \leq 0.33$, $LiMnO_3$, $LiMn_2O_3$, $LiMnO_2$, and the like; lithium copper oxide ($Li_2CuO_2$); vanadium oxides such as $LiV_3O_8$, $V_2O_5$, $Cu_2V_2O_7$, and the like; Ni site-type lithium nickel oxides represented by the formula $LiNi_{1-i}M^4_iO_2$ wherein $M^4$ is Co, Mn, Al, Cu, Fe, Mg, B, or Ga and $0.01 \leq i \leq 0.3$; lithium manganese composite oxides represented by the formula $LiMn_{2-j}M^5_jO_2$ wherein $M^5$ is Co, Ni, Fe, Cr, Zn, or Ta and $0.01 \leq j \leq 0.1$ or the formula $Li_2Mn_3M^6O_8$ wherein $M^6$ is Fe, Co, Ni, Cu, or Zn; $LiMn_2O_4$ in which a part of Li in the formula is substituted with alkaline earth metal ions; disulfide compounds; $LiFe_3O_4$; or $Fe_2(MoO_4)_3$, but the present invention is not limited thereto.

The positive electrode active material may be included in an amount of 50 wt % to 99 wt %, particularly, 70 wt % to 98 wt %, with respect to the total weight of solids of a positive electrode slurry.

As a solvent for fabricating the positive electrode, an organic solvent such as N-methylpyrrolidone (NMP), dimethyl formamide (DMF), acetone, or dimethyl acetamide, water, or the like may be used, and these solvents may be used alone or a mixture of two or more of these materials may be used. The solvent may be used in an amount sufficient to dissolve and disperse the positive electrode active material, the binder, and the conductive material in consideration of the thickness of the coated slurry and manufacturing yield.

The conductive material is not particularly limited as long as it does not cause chemical changes in the fabricated battery and has conductivity, and non-limiting examples of conductive materials include graphite such as natural or artificial graphite; carbon black such as acetylene black, Ketjen black, channel black, furnace black, lamp black, and thermal black; conductive fibers such as carbon fibers and metallic fibers; conductive tubes such as carbon nanotubes; metallic powders such as carbon fluoride powder, aluminum powder, and nickel powder; conductive whiskers such as zinc oxide and potassium titanate; conductive metal oxides such as titanium oxide; and conductive materials such as graphene derivatives and polyphenylene derivatives. The conductive material may be used in an amount of 1 wt % to 20 wt % with respect to the total weight of solids of the positive electrode slurry.

As the dispersant, an aqueous dispersant or an organic dispersant such as N-methyl-2-pyrrolidone may be used. The dispersant may be used in an amount of 0.01 wt % to 10 wt % with respect to the total weight of solids of the positive electrode active material slurry.

Meanwhile, as the separator, any porous polymer film commonly used as a separator in the art, for example, a porous polymer film formed of a polyolefin-based polymer, such as an ethylene homopolymer, a propylene homopolymer, an ethylene/butene copolymer, an ethylene/hexene copolymer, or an ethylene/methacrylate copolymer, or a stacked structure having porous polymer films formed of these materials may be used, or a general porous non-woven fabric, for example, a non-woven fabric made of high melting point-glass fiber, polyethylene terephthalate fiber, or the like may be used, but the present invention is not limited thereto.

A lithium salt that may be included as an electrolyte used in the present invention may be, without limitation, any lithium salt commonly used in an electrolyte for a lithium secondary battery, and anions of the lithium salt may be, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2 N^-$.

In an electrolytic solution used in the present invention, an organic solvent included in the electrolytic solution may be, without limitation, any organic solvent commonly used in an electrolytic solution for a secondary battery, and representatively, any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, a mixture of two or more of these materials, or the like may be used. In particular, among the carbonate-based organic solvents, ethylene carbonate and propylene carbonate, which are cyclic carbonates, are preferably used due to high permittivity as a high-viscosity organic solvent, thus satisfactorily dissociating a lithium salt in an electrolyte. When such a cyclic carbonate is used in combination with a low-viscosity, low-permittivity linear carbonate, such as dimethyl carbonate and diethyl carbonate, in an appropriate ratio, an electrolytic solution having high electrical conductivity may be prepared, and thus such cyclic carbonates are more preferably used.

Optionally, an electrolytic solution according to the present invention may further include an additive such as an anti-overcharging agent included in a general electrolytic solution.

The external shape of the lithium secondary battery according to the present invention is not particularly limited, but may be a cylindrical or rectangular can type, a pouch type, a coin type, or the like.

The lithium secondary battery according to the present invention may not only be used in a battery cell used as a power source for small devices, but may also be used as a unit battery in medium- or large-scale battery modules including a plurality of battery cells.

MODE FOR CARRYING OUT THE INVENTION

Examples

Hereinafter, the present invention will be described in further detail with reference to the following Examples and Experimental Example for illustrative purposes only, but these Examples and Experimental Example are not intended to limit the present invention. The examples according to the present invention can be modified into many different forms, and the scope of the present invention should not be construed as being limited to the examples described below. The examples of the present invention are provided to more completely explain the present invention to those of ordinary skill in the art.

Example 1

<Preparation of Premixed Slurry>

296.44 g of $Li_4Ti_5O_{12}$ having a mean particle diameter ($D_{50}$) of 0.75 μm and a specific surface area of 6.3 m²/g was added to a solution prepared by dissolving 3.56 g of carboxymethyl cellulose (CMC, Daicel 1205, manufactured by Daicel) in 200 g of water, and the resulting solution was mixed using a saw-type impeller having a diameter of 80 mm (manufactured by VMA-GETZMANN GMBH, DISPERMAT CN20) at 5,000 rpm for 30 minutes, thereby preparing a LTO premixed slurry.

<Addition of Dispersant>

44.7 g of the LTO premixed slurry was put into a 125 mL Nalgene tube, and polyacrylic acid (manufactured by Wako Pure Chemical) having a weight average molecular weight (Mw) of 5,000 g/mol as the dispersant and water were added thereto to adjust the weight to 50 g.

<Dispersion of Slurry>

100 g of zirconia beads having a particle diameter of 3 mm were added to the premixed slurry to which the dispersant was applied, followed by shaking using a shaker at 300 rpm for 2 hours and dispersion, thereby completing the preparation of a negative electrode slurry.

Examples 2 to 7 and Comparative Examples 1 to 8

Negative electrode slurries were prepared using the same method as that used in Example 1, except that the same types of dispersant as shown in Table 1 below were used in the amounts shown below, instead of the polyacrylic acid having a weight average molecular weight (Mw) of 5,000 g/mol used as a dispersant in Example 1.

TABLE 1

| Example | Dispersant | Weight average molecular weight (g/mol) | Parts by weight of dispersant with respect to 100 parts by weight of LTO |
|---|---|---|---|
| Example 1 | Polyacrylic acid (manufactured by Wako Pure Chemical) | 5,000 | 2 |
| Example 2 | Polyacrylic acid (synthesized for use) | 10,000 | 2 |
| Example 3 | Polyacrylic acid (manufactured by Wako Pure Chemical) | 25,000 | 2 |
| Example 4 | Polyacrylic acid (manufactured by Wako Pure Chemical) | 250,000 | 2 |
| Example 5 | Polyacrylic acid (manufactured by Wako Pure Chemical) | 25,000 | 5 |
| Example 6 | Polyacrylic acid (manufactured by Wako Pure Chemical) | 25,000 | 10 |
| Example 7 | Poly(acrylic acid-maleic acid) copolymer (manufactured by Sigma Aldrich) | 3,000 | 3 |
| Comparative Example 1 | Isophthalic acid (manufactured by Sigma Aldrich) | 166 | 4 |
| Comparative Example 2 | Polyacrylic acid (manufactured by Sigma Aldrich) | 1,800 | 3 |
| Comparative Example 3 | Polyacrylic acid (manufactured by Wako Pure Chemical) | 5,000 | 1 |
| Comparative Example 4 | Polyacrylic acid (synthesized for use) | 10,000 | 1 |
| Comparative Example 5 | Ammonium salt of polymethacrylic acid (DARVAN-CN, manufactured by Vanderbilt Minerals) | 13,000 | 3 |
| Comparative Example 6 | Polyacrylic acid (manufactured by Polysciences) | 1,000,000 | 2 |
| Comparative Example 7 | Denatured fatty alcohol ethoxylate (FA4480, manufactured by BASF, non-ionic wetting and dispersing agent) | — | 2 |
| Comparative Example 8 | DISPERBYK-2055 (manufactured by BYK, cationic wetting and dispersing agent) | — | 2 |

Experimental Example

Each of the negative electrode slurries prepared according to Examples 1 to 7 and Comparative Examples 1 to 8 was diluted 1,000 times, and then a laser diffractometer (manufactured by Malvern, Mastersizer 3000) was used to measure the mean particle diameter ($D_{50}$) of particles included in each negative electrode slurry and the results thereof are shown in Table 2 below.

In addition, the viscosity of each of the negative electrode slurries of Example 1 to 7 and Comparative Examples 1 to 8 was measured using a viscometer (manufactured by TOKI, TV-22 viscometer) at 1 rpm and 25° C., and the results thereof are shown in Table 2 below.

TABLE 2

| Example | Dispersant | Weight average molecular weight (g/mol) | Parts by weight of dispersant with respect to 100 parts by weight of LTO | Particle diameter ($D_{50}$) (μm) | Viscosity (Pa·s) |
|---|---|---|---|---|---|
| Example 1 | Polyacrylic acid | 5,000 | 2 | 1.03 | 1.72 |
| Example 2 | Polyacrylic acid | 10,000 | 2 | 1.08 | 1.28 |

TABLE 2-continued

| Example | Dispersant | Weight average molecular weight (g/mol) | Parts by weight of dispersant with respect to 100 parts by weight of LTO | Particle diameter ($D_{50}$) (μm) | Viscosity (Pa·s) |
|---|---|---|---|---|---|
| Example 3 | Polyacrylic acid | 25,000 | 2 | 1.09 | 1.07 |
| Example 4 | Polyacrylic acid | 250,000 | 2 | 0.86 | 3.6 |
| Example 5 | Polyacrylic acid | 25,000 | 5 | 0.51 | 0.12 |
| Example 6 | Polyacrylic acid | 25,000 | 10 | 0.56 | 0.26 |
| Example 7 | Poly(acrylic acid-maleic acid)copolymer | 3,000 | 3 | 0.63 | 1.05 |
| Comparative Example 1 | Isophthalic acid | 166 | 4 | 2.68 | 11.43 |
| Comparative Example 2 | Polyacrylic acid | 1,800 | 3 | 0.87 | 5.33 |
| Comparative Example 3 | Polyacrylic acid | 5,000 | 1 | 1.04 | 14.08 |
| Comparative Example 4 | Polyacrylic acid | 10,000 | 1 | 1.11 | 12.16 |
| Comparative Example 5 | Ammonium salt of polymethacrylic acid | 13,000 | 3 | 2.44 | 7.32 |
| Comparative Example 6 | Polyacrylic acid | 1,000,000 | 2 | Impossible to disperse due to high viscosity | |
| Comparative Example 7 | FA4480 | — | 2 | 0.92 | 5.9 |
| Comparative Example 8 | DISPERBYK-2055 | — | 2 | 1.1 | 5.77 |

In Table 2, the amount denotes parts by weight of the dispersant with respect to 100 parts by weight of the lithium titanium oxide (LTO) Referring to Table 2, it can be confirmed that the mean particle diameter of lithium titanium oxide particles included in each of the negative electrode slurries of Examples 1 to 7 is small and each slurry has low viscosity.

Through comparison between Examples 1 to 6 and Comparative Examples 2 and 6, it was confirmed that the weight average molecular weight of used carboxylic acid-containing polymer dispersant affected dispersibility and conductivity. In particular, referring to the results of Comparative Example 2, when the weight average molecular weight of the carboxylic acid-containing polymer dispersant is too small, an increase in the size of lithium titanium oxide particles present in the negative electrode slurry was suppressed, but the viscosity of the negative electrode slurry was increased to greater than an appropriate level. Referring to the results of Comparative Example 6, when the weight average molecular weight of the carboxylic acid-containing polymer dispersant is too large, the viscosity was increased to an extent that dispersion is impossible.

In addition, through comparison between Examples 1, 2, 5 and 6 and Comparative Examples 3 and 4, it can be confirmed that there is also a need to control the amount of used carboxylic acid-containing polymer dispersant to a certain range. In particular, Examples 1, 2, 5, and 6 are examples where the carboxylic acid-containing polymer dispersants were used in amounts of 2, 2, 5, and 10 parts by weight, respectively, with respect to 100 parts by weight of the lithium titanium oxide, from which it was confirmed that the mean particle diameter of lithium titanium oxide particles present in all the negative electrode slurries was small and the viscosity of all the slurries was low. However, in the case of Comparative Examples 3 and 4 where the amount of used carboxylic acid-containing polymer dispersant was too small, it was confirmed that the viscosity of each negative electrode slurry increased.

Comparative Example 1 is an example where isophthalic acid which contains carboxylic acid in the molecule but is not a polymer and has a molecular weight of 166 g/mol was used as the dispersant, and in this case, the mean particle diameter of lithium titanium oxide particles present in the negative electrode slurry was large and the slurry exhibited high viscosity.

Comparative Example 5 is an example where an ammonium salt of polymethacrylic acid was used as the dispersant, and in this case, while the molecular weight and amount satisfied the conditions of an aqueous slurry composition of the present invention, the dispersant did not contain carboxylic acid in a structure thereof, and thus the mean particle diameter of lithium titanium oxide particles present in the negative electrode slurry was large, and the slurry exhibited high viscosity.

The invention claimed is:
1. A negative electrode slurry comprising:
lithium titanium oxide;
a carboxylic acid-containing polymer dispersant;
a binder; and
an aqueous solvent,
wherein the carboxylic acid-containing polymer dispersant has a weight average molecular weight of 2,500 g/mol to 25,000 g/mol, and wherein the carboxylic acid-containing polymer dispersant is present in an amount of 1.5 parts by weight to 20 parts by weight with respect to 100 parts by weight of the lithium titanium oxide.

2. The negative electrode slurry of claim 1, wherein the lithium titanium oxide is present in primary particles, which primary particles are agglomerated into secondary particles,
wherein the secondary particles have a mean particle diameter, $D_{50}$, of 0.01 μm to 1 μm.

3. The negative electrode slurry of claim 1, wherein the lithium titanium oxide has a specific surface area of 0.1 m$^2$/g to 50 m$^2$/g, wherein the specific surface area is measured using a Brunauer-Emmett-Teller method.

4. The negative electrode slurry of claim 1, wherein the lithium titanium oxide is represented by Formula 1 below:

$$Li_xTi_yO_4 \qquad \text{[Formula 1]}$$

wherein, in Formula 1, 0.5≤x≤3 and 1≤y≤2.5.

5. The negative electrode slurry of claim 1, wherein the carboxylic acid-containing polymer dispersant comprises, in a polymer chain, repeating units derived from acrylic acid, maleic acid, and maleic anhydride.

6. The negative electrode slurry of claim 5, wherein the carboxylic acid-containing polymer dispersant comprises one or more selected from the group consisting of polyacrylic acid, a poly(acrylic acid-maleic acid)copolymer, a poly(maleic acid-styrene)copolymer, a poly(maleic anhydride-isobutylene)copolymer, and a poly(maleic acid-vinyl ether)copolymer.

7. The negative electrode slurry of claim 1, wherein the carboxylic acid-containing polymer dispersant is present in an amount of 2 parts by weight to 10 parts by weight with respect to 100 parts by weight of the lithium titanium oxide.

8. The negative electrode slurry of claim 1, wherein the negative electrode slurry has a solid content of 50 wt % to 80 wt %.

9. The negative electrode slurry of claim 1, wherein the negative electrode slurry has a viscosity of 1.72 Pa·s or less at 25° C. when comprising 50 wt % or more of the lithium titanium oxide.

10. The negative electrode slurry of claim 1, wherein the lithium titanium oxide present in the negative electrode slurry has a mean particle diameter, $D_{50}$, of 0.2 μm to 1.5 μm.

11. A method of preparing the negative electrode slurry of claim 1, the method comprising:
step (1) preparing a premixed slurry by mixing lithium titanium oxide, the carboxylic acid-containing polymer dispersant, the binder, and the aqueous solvent; and
step (2) dispersing the premixed slurry after adding the carboxylic acid-containing polymer dispersant, by stirring,
wherein the carboxylic acid-containing polymer dispersant has a weight average molecular weight of 2,500 g/mol to 25,000 g/mol and is present in an amount of 1.5 parts by weight to 20 parts by weight with respect to 100 parts by weight of the lithium titanium oxide.

12. The method of claim 11, wherein step (1) comprises: step (1-1) mixing the binder, lithium titanium oxide (LTO), and the aqueous solvent to obtain a mixture; and step (1-2) preparing the premixed slurry by adding the carboxylic acid-containing polymer dispersant to the mixture obtained in process (1-1).

13. A negative electrode for a lithium secondary battery, wherein the negative electrode is fabricated using the negative electrode slurry according to claim 1.

14. A lithium secondary battery comprising the negative electrode of claim 13.

* * * * *